United States Patent [19]

Ure

[11] 4,028,307

[45] June 7, 1977

[54] PREPARATION OF POLYESTERS USING SALTS OF SUBSTITUTED QUATERNARY AMMONIUM BASES

[75] Inventor: George R. Ure, Charlotte, N.C.

[73] Assignee: Fiber Industries, Inc., Charlotte, N.C.

[22] Filed: Oct. 16, 1975

[21] Appl. No.: 623,174

Related U.S. Application Data

[63] Continuation of Ser. No. 474,644, May 30, 1975, abandoned.

[52] U.S. Cl. .............................. 260/75 R; 260/75 N; 260/475 P
[51] Int. Cl.$^2$ ................. C08G 63/14; C08G 63/18; C08G 63/38
[58] Field of Search ............ 260/75 R, 75 N, 475 P

[56] References Cited

UNITED STATES PATENTS

| | | | |
|---|---|---|---|
| 3,039,998 | 6/1962 | Boerma | 260/75 |
| 3,325,454 | 6/1967 | Nakamura et al. | 260/75 |

FOREIGN PATENTS OR APPLICATIONS

| | | |
|---|---|---|
| 777,628 | 6/1957 | United Kingdom |
| 782,036 | 8/1957 | United Kingdom |
| 835,442 | 5/1960 | United Kingdom |

*Primary Examiner*—Lester L. Lee
*Attorney, Agent, or Firm*—Robert J. Blanke

[57] ABSTRACT

Novel carboxylic acid salts of substituted quaternary ammonium bases and processes for the production of polyesters by direct esterification of a glycol and a dicarboxylic acid involving the additions of such salts to the esterification reaction.

3 Claims, No Drawings

PREPARATION OF POLYESTERS USING SALTS OF SUBSTITUTED QUATERNARY AMMONIUM BASES

This is a continuation, of application Ser. No. 474,644, filed May 30, 1975 and now abandoned.

This invention relates to salts of carboxylic acids and derivatives thereof and substituted quaternary ammonium bases and to their use in the esterification reaction of diols and carboxylic acids and in particular to their use in the esterification reaction of ethylene glycol and terephthalic acid which on subsequent polycondensation provides polyesters and in particular polyethylene terephthalate having improved properties.

There have been numerous attempts to provide polyesters and in particular polyethylene terephthalate with improved properties such as improved thermal stability, substantial elimination of diglycol and higher softening points of the polymer products, among other improvements. In particular various additives to the reactants or reaction products of polyethylene terephthalate have been recommended to accomplish these results, but if one property was improved, another property was detrimentally affected. For example, for the purpose of preventing the lowering of the softening point of polyethylene terephthalate, various proposals have been made to conduct the esterification reaction in the presence of an alkaline substance such as the inorganic alkalis (British Pat. No. 777,628), the alkali metal salts of terephthalic acid (British Pat. No. 782,036), the alkaline earth metal salts of terephthalic acid (British Pat. No. 835,442), the tertiary amines (Belgian Pat. No. 854,147) or the quaternary ammonium compounds (U.S. Pat. No. 3,325,454).

However, several of the alkaline substances such as mentioned above are dispersed in the resultant polymer without having dissolved therein and frequently form aggregates which tend to adversely affect the conversion of polymer to fibers and films. In the conversion of polymer to fibers, the presence of particulates, such as insoluble salts of terephthalic acid, decomposition products, agglomerated delustrant and the like, results in increased pack pressure and/or blocked spinneret holes, amony other problems, which in turn result in greatly shortened pack life and failing filaments, among other deleterious effects. A convenient measure of the effects of pack life and failing filaments on product quality is provided by major defects per $10^8$ yards. Major defects are broken filaments which have been stripped back from the end to which they are attached (slubs) or foreign material, tangled filaments and the like of such size as to register as a fault in a Lindly counter. The presence of particulates in polymer is especially critical in film formation and can result in haze or cloudiness and surface defects. Others of the alkaline substances mentioned above decompose into products which discolor the polymer; still others decompose into volatile components which are removed from the reaction system, greatly reducing the effectiveness and efficiencies of the additives.

Novel salts have been discovered which when present in the esterification of ethylene glycol and a dicarboxylic acid aid in substantially eliminating the production of diethylene glycol and on subsequent polymerization provide a polymer with outstanding thermal stability properties as well as high softening point properties of the polymer product. These novel salts are the salts of carboxylic acids or derivatives thereof and substituted quaternary ammonium bases wherein the substituents are selected from the class consisting of alkyl, cycloalkyl, aralkyl, alkaryl and aryl radicals. The preferred salts for the esterification reaction of terephthalic acid and ethylene glycol are the salts of terephthalic acid and the substituted quaternary ammonium bases wherein the substituents are alkyl radicals and contain from 1 to 4 carbon atoms, at least one of the said radicals and no more than two of the said alkyl radicals being substituted.

The carboxylic acid portion of the salts of the present invention may be a mono-, di- or polycarboxylic acid selected from the class consisting of alkyl, cycloalkyl, aralkyl, alkaryl and aryl carboxylic acids and may be unsubstituted or substituted. As stated above, the preferred carboxylic acid is terephthalic acid.

The substituted quaternary ammonium bases used to prepare the salts of the present invention include those having the following general formula:

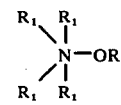

wherein R is a monovalent group or radical selected from the group consisting of hydrogen, alkyl, cycloalkyl, aralkyl, alkaryl and aryl, and $R_1$ is a monovalent group or radical independently selected from (a) the group consisting of alkyl, cycloalkyl, aralkyl, alkaryl and aryl, and (b) the group represented by the general formula:

wherein $R_2$ is a trivalent group or radical selected from the group consisting of alkyl, cycloalkyl, aralkyl, alkaryl and aryl, and Y is a member selected from the group consisting of hydrogen and hydroxyl, at least one Y being hydroxyl; at least one and no more than two $R_1$ must be selected from group (b). Also, more than one nitrogen may be present in the same molecule by the simple expedient of at least one $R_1$ group as defined above being common to more than one quaternary nitrogen.

The substituted quaternary ammonium bases which are preferred for the preparation of the salts of the present invention may be represented by the following general formula:

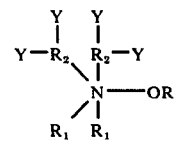

wherein R is a monovalent group or radical selected from the group consisting of hydrogen, alkyl, cycloalkyl, aralkyl, alkaryl and aryl, $R_1$ is a monovalent group or radical selected from the group consisting of alkyl, cycloalkyl, aralkyl, alkaryl and aryl, $R_2$ is a trivalent group or radical selected from the group consisting of alkyl, cycloalkyl, aralkyl, alkaryl, and aryl, and Y is a member independently selected from the group consisting of hydrogen and hydroxyl with at least one Y being hydroxyl. Also, more than one nitrogen may be present in the same molecule by the simple expedient of at least one $R_1$ or $R_2$ group as defined above being common to more than one quaternary nitrogen.

The salts of this invention can be readily produced by the combination of carboxylic acids or derivatives thereof and substituted quaternary ammonium bases in the absence of catalytic agents at temperatures from about −80° C to below the decomposition temperatures of the substituted quaternary ammonium bases which range normally, depending upon the substituents, from about 100° to about 150° C. The salts which are produced can be characterized, for example, by the following formulae:

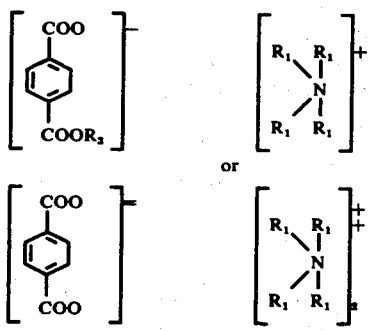

wherein $R_3$ is a monovalent group or radical selected from the group consisting of hydrogen, alkyl, cycloalkyl, aralkyl, alkaryl, and aryl and $R_1$ is a monovalent group or radical independently selected from the group consisting of (a) alkyl, cycloalkyl, aralkyl, alkaryl, and aryl, and (b) a group represented by the general formula:

wherein $R_2$ is a trivalent group or radical selected from the group consisting of alkyl, cycloalkyl, aralkyl, alkaryl and aryl and Y is a member selected from the group consisting of hydrogen and hydroxyl, at least one Y being hydroxyl. At least one and no more than two of $R_1$ must be selected from group (b). Furthermore, more than one quaternary nitrogen may be present in the same molecule by the simple expedient of at least one $R_1$ group as defined above being common to more than one quaternary nitrogen. The preferred salts which are produced can be characterized generally by the following formulae:

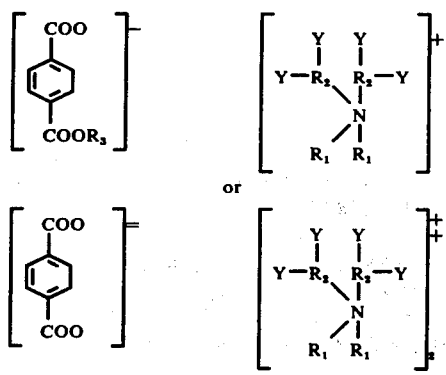

wherein $R_3$ represents a monovalent group or radical selected from the group consisting of hydrogen, alkyl, cycloalkyl, aralkyl, alkaryl and aryl, $R_1$ is a monovalent group or radical independently selected from the group consisting of alkyl, cycloalkyl, aralkyl, alkaryl, and aryl, $R_2$ is a trivalent group or radical independently selected from the group consisting of alkyl, cycloalkyl, aralkyl, alkaryl and aryl, and Y is a member selected from the group consisting of hydrogen and hydroxyl with at least one Y being hydroxyl. More than one nitrogen may be present in the same molecule by the simple expedient of at least one $R_1$ or $R_2$ group as defined above being common to more than one quaternary nitrogen. The carboxylic acids or derivatives which are used as one of the starting materials can include, but are not limited to, acetic acid, glycolic acid, lactic acid, benzoic acid, 2-phenylpropionic acid, cyclohexanecarboxylic acid, adipic acid, terephthalic acid, isophthalic acid, phthalic acid, mono-, di- and polycarboxylic acids of naphthalene, mono-, di -and polycarboxylic acids of anthracene, trimesic acid, pyromellitic acid, mellitic acid, 5-sodiosulfoisophthalic acid, $\alpha$, $\alpha'$-dimethyl-cis,cis-muconic acid, monoalkyl esters of dicarboxylic acids, dialkyl esters of tricarboxylic acids, and the like. The preferred acid which is desired is terephthalic acid. The substituted quaternary ammonium bases which can be used include, among others, hydroxymethyltrimethylammonium hydroxide, 2-hydroxyethyltrimethylammonium hydroxide, 2-hydroxyethyltrimethylammonium methoxide, 2-hydroxyethyltrimethylammonium phenoxide, 2,3-dihydroxypropyltrimethylammonium hydroxide, bis(hydroxymethyl)dimethylammonium hydroxide, bis(2-hydroxyethyl)dimethylammonium hydroxide, bis(2,3-dihydroxypropyl)dimethylammonium hydroxide, p-hydroxyphenyltrimethylammonium hydroxide, p-(hydroxymethyl)phenyltrimethylammonium hydroxide, 4-(hydroxymethyl)cyclohexyltrimethylammonium hydroxide, 2,4-dihydroxyphenyltrimethylammonium hydroxide and the like. The decomposition temperatures of the preferred salts of this invention are found to be in the range of from about 240° C. to about 280° C.

It should be understood that while the salts of the present invention preferably are prepared by the reaction of carboxylic acids with substituted quaternary ammonium bases, other methods of preparation may be employed and still remain within the scope of this invention. For example, 2-hydroxyethyl 2-hydroxyethyltriethylammonium terephthalate may be obtained by treating under anhydrous conditions a mixture of triethylamine and terephthalic acid with ethylene oxide.

The salts of carboxylic acids or derivatives thereof and substituted quaternary ammonium bases of this invention are utilized as additives in the esterification reaction of ethylene glycol and terephthalic acid. These salts are especially useful in the continuous esterification reaction of ethylene glycol and terephthalic acid wherein the reaction temperatures are maintained above 200° C. but below 300° C. It has been discovered that when these salts are utilized in amounts ranging from about 0.001 to about 1 mole percent, preferably from about 0.01 to about 0.5 mole percent, based on the terephthalic acid, the resulting ester is substantially free of diethylene glycol and on subsequent polymerization of the ester provides a polymer having improved thermal stability and a higher softening point. As is well known in the art, polyethylene terephthalate polymers which are used in fiber and film manufacture, are known to be sensitive to heat; i.e., loss of molecular weight of the polymer occurs when extruded into films or fibers. This thermal degradation and low softening points of the polymers can affect the desirable physical properties of the products to provide marginal fibers and films. Without the additives to the esterification reaction as described herein, higher molecular weight polymers must be produced to provide the satisfactory fiber and film products on extrusion, allowing for the thermal degradation, which adds to production costs and production time. Furthermore, the higher molecular weights of the polymers do not substantially contribute to higher softening points. By this invention, esterification of terephthalic acid with ethylene glycol in the presence of the salts of carboxylic acids and substituted quaternary ammonium bases and subsequent polymerization provides polymers which have improved thermal properties, i.e., substantially no loss of molecular weight in extrusion. The resultant polymers also have increased softening points and reduced diethylene glycol content as a result of using the salts of this invention. It is known in the art that the presence of nitrogen bases tends to induce color formation in polyethylene terephthalate polymers. The surprising result in this use of substituted quaternary ammonium salts is that the final polymer is substantially free of nitrogen and at the same time the presence of the salts in the esterification reaction significantly reduces the production of diethylene glycol and increases the thermal stability and softening point of the polymer. Although the presence of such quaternary ammonium bases as quaternary ammonium hydroxides during the esterification reaction of ethylene glycol and terephthalic acid as taught by U.S. Pat. No. 3,325,454, could reasonably be expected to form the salts of the present invention, the use of the salts of the present invention rather than the quaternary ammonium hydroxides results in an unexpected increase in thermal stability of the final polymer and a corresponding decrease in diethylene glycol content. Without wishing to be bound by theory, it is proposed that the surprising and unexpected improvements obtained by the use of the salts of the present invention result from the increased thermal stabilities of said salts relative to the quaternary ammonium hydroxides.

The esterification reaction of ethylene glycol and terephthalic acid can occur at temperatures in the range from 200° to 260° C. under pressures ranging from subatmospheric (400 millimeters mercury) to as high as 2000 pounds per square inch gauge, preferably from atmospheric to 75 pounds per square inch gauge. The polymerization reaction can occur in the temperature range from about 200° C. to as high as 300° C. usually under subatmospheric pressure in the range from 0 to 20 millimeters mercury. Additionally, minor amounts of known modifying materials may be added to the reaction such as various glycols, various dicarboxylic acids such as sebacic acid, adipic acid, isophthalic acid, sulfonated isophthalic acid and the like, dye modifiers, inhibitors (such as sodium hydroxide) and the like. These modifiers may be added as one of the initial reactants during the esterification and polymerization processes or the modifying materials may also be polymerized separately and melt blended with the polyethylene terephthalate as desired. Furthermore, various additives such as delustrants and the like can be added to the polymer product as well as the use of catalysts in order to increase the speed of reaction.

The amounts of ethylene glycol utilized in the esterification reaction can range from 1 to 10 moles, preferably from 1 to 3 moles, per mole of terephthalic acid.

The following examples will serve to illustrate the invention without limiting the same:

EXAMPLE I

Terephthalic acid (16 parts) is slurried in methanol (80 parts) at 0° C. A 45% solution of 2-hydroxyethyltrimethylammonium hydroxide (choline base) in methanol (10 parts) is added to the slurried terephthalic acid. After stirring for 30 minutes the excess terephthalic acid is removed by filtration. The filtrate is concentrated under reduced pressure and cooled, giving the mono-2-hydroxyethyltrimethylammonium salt of terephthalic acid as a precipitate which is isolated by filtration. That the product is the mono-salt is shown by the following elemental analysis:

|  | % Carbon | % Hydrogen | % Nitrogen |
| --- | --- | --- | --- |
| Calculated for $C_{13}H_{19}NO_5$ | 57.98 | 7.11 | 5.20 |
| Found | 58.07 | 7.19 | 5.34 |

Thermogravimetric analysis (TGA) provides a means of determining the physical or chemical response of a material to increasing temperatures over a particular temperature range. That is, as the temperature of the material and its initial environment is increased, the material may be removed from its initial environment by one or more processes such as sublimation, distillation, decomposition, disassociation and the like. That TGA is a proven, well-known analytical tool is evidenced by numerous expert treaties such as "Thermal Analytical Methods of Investigation," by Paul D. Garn (Academic Press, New York, 1965), in which Chapter 9, Thermogravimetric Analysis and Chapter 10, Thermogravimetric Apparatus are especially relevant to the application of TGA as a means of characterizing the salts of the present invention.

Briefly, TGA results in a plot of the loss of weight of a given sample with increasing temperature. The weight loss may occur quickly in one simple step or in several stages over a wide temperature range. As applied to the salts of the present invention, only the first stage (corrected for loss of water or solvent) is of importance since this stage represents the removal of nitrogen from the initial environment. In general, subsequent stages represent removal from the initial environment of decomposition products of the salts of the present invention, which decomposition products do not contain nitrogen. Without wishing to be bound by theory, it is known that quaternary ammonium bases in general thermally decompose to give, among other products, tertiary amines. At the temperatures encountered in the esterification of terephthalic acid with ethylene glycol and the polymerization of the resulting product, the tertiary amines are volatile. Thus the nitrogen is removed from the initial environment and the thermal histories of the remaining decomposition products are relatively unimportant.

The characterization of the salts of the present invention by therogravimetric analysis may be clarified by defining two terms: the leaving temperature range and the median leaving temperature. The leaving temperature range is that temperature range from which weight loss first occurs (corrected for the loss of water or solvent) to that at which weight loss ceases said weight loss (hereinafter referred to as ΔW) being restricted to the first stage as outlined in the preceding discussion. The median leaving temperature is the temperature at which one-half of the first stage weight loss occurs; that is, the temperature corresponding to ½ ΔW. The higher the leaving temperature range and the median leaving temperature of the salts of the present invention, the higher the processing temperatures which may be employed in their use. Higher processing temperatures in turn result in increased reaction rates and hence increased productivity. In practice, the median leaving temperature appears to represent an approximate maximum temperature for the esterification reaction, whether in a batch or a continuous process; that is, an esterification temperature much above the median leaving temperature results in the too rapid decomposition of the salts of the present invention, greatly reducing the effectiveness and usefulness of said salts. Furthermore, it is desirable that the maximum temperature employed in the process (i.e., the polymerization or high polymerizer temperature) be above that of the median leaving temperature in order to insure the absense of nitrogen in the polymer product.

The salt of Example I has a leaving temperature range of 235°–325° C. and a median leaving temperature of 278° C.

EXAMPLE II

To 134 parts of ethylene glycol is added 5 parts of a 45% solution of 2-hydroxyethyltrimethylammonium hydroxide (choline base) in methanol, followed by 10 parts of terephthalic acid. The mixture is stirred at room temperature and used without isolating the salt.

EXAMPLE III

Terephthalic acid (4 parts) is slurried in methanol (40 parts) at 0° C. A 45% solution of 2-hydroxyethyltrimethylammonium hydroxide (choline base) in methanol (27 parts) is added to the slurried terephthalic acid. The mixture is stirred until a solution is obtained. The solution then is concentrated under reduced pressure, giving an oil. The oil is extracted with ether and allowed to stand in the cold. Crystals form which are isolated by filtration and washed. Based on the nitrogen analysis, the material is a mixture of the mono- and di-choline salts of terephthalic acid:

|  | Found | Calculated for Mono-Salt | Calculated for Di-Salt |
| --- | --- | --- | --- |
| % Nitrogen | 6.91 | 5.20 | 7.52 |

Although the di-salt is not easily obtained in pure form, it should be understood that pure salts, impure salts, mixtures of mono- and di-salts, and the like all fall within the scope and spirit of the invention.

EXAMPLE IV

Example II is repeated, except that the methanol solution of 2-hydroxyethyltrimethylammonium hydroxide is replaced with 8 parts of a 50% solution of bis(2-hydroxy-1-propyl)propyl methylammonium hydroxide in methanol. As in Example II, the resultant mixture is used without isolating the salt.

Bis(2-hydroxy-1-propyl)propylamine or 1,1'-(propylimino)-di-2-propanol may be prepared by adding excess propylene oxide to an aqueous solution of propylamine at 60–80° C. [J. L. Boivin, Canadian Journal of Chemistry, 36, 1405 (1958)]. The quaternary ammonium hydroxide may then be obtained according to standard procedures. The standard procedures are illustrated by A. C. Cope, et al., Journal of the American Chemical Society, 79, 4720 (1957), wherein the tertiary amine is converted to the quaternary ammonium iodide by refluxing the amine and excess methyl iodide in a suitable solvent; conversion of the quaternary ammonium iodide to the hydroxide is accomplished by treating an aqueous solution of the iodide with either an ion-exchange resin or silver oxide.

EXAMPLE V

Example II is repeated, except that the methanol solution of 2-hydroxyethyltrimethylammonium hydroxide is replaced with 13 parts of a 30% solution of trans-2-hydroxycyclohexylmethyltrimethylammonium hydroxide in methanol. As in Example II, the resultant mixture is used without isolating the salt.

Trans-2-hydroxycyclohexylmethyltrimethylammonium hydroxide may be obtained from trans-2-hydroxycyclohexylmethyldimethylamine by the standard procedures outlined in Example IV. Trans-2-hydroxycyclohexylmethyldimethylamine may be obtained by recrystallizing a mixture of cis- and trans-2-hydroxycyclohexylmethyldimethylamine benzoate ester hydrochlorides [V. J. Traynelis and J. G. Dadura, Journal of Organic Chemistry, 26, 1813 (1961)]; the cis- and trans-isomers of the tertiary amine are obtained upon reducing 2-dimethylaminomethylcyclohexanone in 50% aqueous ethanol with sodium borohydride [V. J. Traynelis and J. G. Dadura, Journal of Organic Chemistry, 26, 1813 (1961)].

EXAMPLE VI

Example II is repeated, except that the methanol solution of 2-hydroxyethyltrimethylammonium hydroxide is replaced with 12 parts of a 30% solution of 3-hydroxycyclohexyltrimethylammonium hydroxide in methanol. As in Example II, the resultant mixture is used without isolating the salt.

Treating 3-aminocyclohexanol with formaldehyde and formic acid (Leukart reaction) results in 3-dimethylaminocyclohexanol (cis- and trans-isomers) [V. J. Traynelis and J. G. Dadura, Journal of Organic Chemistry, 26, 1813 (1961)]. Conversion of the 3-dimethylaminocyclohexanol to 3-hydroxycyclohexyltrimethylammonium hydroxide may be accomplished by the standard procedures outlined in Example IV.

EXAMPLE VII

Example II is repeated, except that the methanol solution of 2-hydroxyethyltrimethylammonium hydroxide is replaced with 9 parts of a 40% solution of m-hydroxyphenyltrimethylammonium hydroxide in methanol. As in Example II, the resultant mixture is used without isolating the salt.

m-Hydroxyphenyltrimethylammonium hydroxide may be obtained by standard procedures, such as those outlined in Example IV, from m-dimethylaminophenol. m-Dimethylaminophenol may be obtained by reacting N,N-dimethyl-m-anisidine with 66% hydrobromic acid at 120°–150° C. [H. Bothe and H. Wunderlich, German (East) Pat. No. 10,148, Aug. 1, 1955]. N,N-Dimethyl-m-anisidine may be obtained by treating m-anisidine with sodium bicarbonate and dimethylsulfate in aqueous solution at 30° C. (A. Mangini and R. Passerini, *Journal of the Chemical Society*, 1956, 4954).

EXAMPLE VIII

Example II is repeated, except that the methanol solution of 2-hydroxyethyltrimethylammonium hydroxide is replaced with 14 parts of a 30% solution of 2-hydroxypropylene-1,3-bis(trimethylammonium hydroxide) in methanol. As in Example II, the resultant mixture is used without isolating the salt.

2-Hydroxypropylene-1,3-bis(trimethylammonium hydroxide) may be obtained from 1,3-bis(dimethylamino)-2-propanol by standard procedures such as outlined in Example IV. 1,3-Bis(dimethylamino)-2-propanol may be obtained by treating 1,3-dichloro-2-hydroxypropane with dimethylamine in benzene or acetone at 110°–120° C. [N. K. Kochetkov and L. A. Vorotnikova, *Zhurnal Obschei Khimii*, 29, 532 (1959)].

Example IX

The following materials are charged to an autoclave fitted with a distillation column:

| | |
|---|---|
| Terephthalic acid: | 25.0 pounds |
| Ethylene glycol: | 18.7 pounds |
| Sodium hydroxide | 0.0015 pound |
| Antimony trioxide | 0.0117 pound |
| Phosphorous acid | 0.0175 pound |

The autoclave is purged with nitrogen and heated at 255° C. under a pressure of 50 pounds per square inch guage for a period of time sufficient to complete the esterification of terephthalic acid with ethylene glycol. The esterification reaction is forced to completion by the concomitant removal of water as it is formed; excess ethylene glycol is removed also. At this stage, the pressure is decreased to below about 0.5 millimeter of mercury and the temperature is increased to 285° C. for a period of time sufficient to produce a polyethylene terephthalate polymer having an intrinsic viscosity of 0.68 deciliters per gram (measured in o-chlorophenol at 25° C.). The polymer thus produced has a diethylene glycol content of 5.2 mole percent, free carboxyl end groups of 21 equivalents per $10^6$ grams, and a melting point of 252° C.

EXAMPLE X

Example IX is repeated, except that the sodium hydroxide is replaced with the salt of Example II. The resulting polymer has an intrinsic viscosity of 0.65 deciliters per gram, a diethylene glycol content of 4.1 mole percent, free carboxyl end groups of 17 equivalents per $10^6$ grams, and a melting point of 254° C.

EXAMPLE XI

Example IX is repeated, except that the sodium hydroxide is omitted. The resulting polymer has an intrinsic viscosity of 0.68 deciliters per gram, a diethylene glycol content of 11.5 mole percent, free carboxyl end groups of 17 equivalents per $10^6$ grams, and a melting point of 245° C.

It should be noted that, in the last three examples, the salts of the present invention, as exemplified by the salt of Example II, are more effective than sodium hydroxide in reducing the diethylene glycol level of the polymer product. Furthermore, the salts of the present invention do not form or contribute to the formation of particulates in the polymer. The foregoing three examples do not necessarily represent the optimum utilization of the salts of the present invention; however, the polymer products obtained in Examples IX, X, and XI show that the salts of the present invention result in lowered diethylene glycol content.

EXAMPLE XII

Example IX is repeated, except that the sodium hydroxide is replaced with the salt of Example IV. The resulting polymer has properties similar to those of the polymer of Example X.

EXAMPLE XIII

Example IX is repeated, except that the sodium hydroxide is replaced with the salt of Example VI. The resulting polymer has properties similar to those of the polymer of Example X.

EXAMPLE XIV

Example IX is repeated, except that the sodium hydroxide is replaced with the salt of Example VIII. The resulting polymer has properties similar to those of the polymer of Example X.

EXAMPLE XV

In a continuous process, 753 pounds per hour of terephthalic acid and 450 pounds per hour of ethylene glycol in the presence of 0.02 weight percent sodium hydroxide based on the weight of polymer, were continuously added to an esterification unit maintained at a temperature of 243° C. and a pressure of 40 pounds per square inch guage. The residence time of the esterification product is sufficient to remove bis(2-hydroxyethyl) terephthalate and derivative products such as low molecular weight products, hereinafter referred to as equilibrium monomer, in the same proportion as the starting materials are fed to the esterification reactor. The equilibrium monomer is pumped to a low polymerizer maintained at temperatures in the range from 255° to 275° C. and at pressures from 20 to 100 millimeters mecury. At the same time 0.027 weight percent trimethyl phosphite and 0.06 weight percent antimony trioxide are added continuously to the equilibrium monomer. The materials remain in the low polymerizer for a period of time sufficient to provide a polymer of intrinsic viscosity in the range of about 0.2 to about 0.3 deciliters per gram. This material is pumped to a high polymerizer at a temperature at 280° C. and at pressures of about 0.5 to 2.0 millimeters of mercury to provide further polymerization to an intrinsic viscosity in excess of 0.4 deciliters per gram and in the range from 0.4 to 1.0 deciliters per gram. In this case an intrinsic viscosity in the range of 0.9 deciliters per gram is obtained. The polymer is extruded into filaments, drawn, collected and used to produce textile articles or industrial products such as tire cord. During beaming of the yarn produced from the polymer of this example, the number of major defects obtained per $10^6$ yards is 19.1.

EXAMPLE XVI

Example XV is repeated, except that the sodium hydroxide is replaced with 0.02 weight percent of 2-hydroxyethyltrimethylammonium hydroxide (choline base) in ethylene glycol. Both the sodium hydroxide and the 2-hydroxyethyltrimethylammonium hydroxide (choline) are introduced into the esterifier feed line as soon as possible after the addition of the ethylene glycol to the terephthalic acid. Thus ample time is allowed for the reaction of 2-hydroxyethyltrimethylammonium hydroxide with terephthalic acid to form a salt of the present invention and very closely resembles Examples II and IV to VIII, inclusive, in the preparation of the salts of the present invention. During the spinning (extruding) of the polymer of this example, lower pack pressure and fewer failing filaments are obtained, compared with Example XV. Upon beaming yarn produced from the polymer of this example, 11.7 major defects per $10^6$ yards are obtained. This represents a reduction in major defects of 39 percent, a significant improvement. This improvement was obtained without altering yarn or cord properties.

EXAMPLE XVII

Example XV is repeated with several modifications of operating conditions. The terephthalic acid and ethylene glycol feed rates are increased to 1360 pounds per hour and 810 pounds per hour, respectively. The esterifier temperature is increased to 255° C. The low polymerizer pressure is maintained at 30 millimeters mercury. The high polymerizer temperature is increased to 290° C. During the course of this example, the average diethylene glycol concentration is 1.39 mole percent in the low polymerizer and 1.49 mole percent in the high polymerizer. The average polymer melting point is 254° C. During spinning the average number of major defects is 19.0.

EXAMPLE XVIII

Example XVI is repeated with the same modifications of Example XVII. During the course of this example, the average diethylene glycol concentration is 1.22 mole percent in the low polymerizer and 0.39 mole percent in the high polymerizer. The average polymer melting point is 255° C. During spinning the average number of major defects is 4.6.

It should be noted that the replacement of sodium hydroxide (Example XVII) with the terephthalic acid salt of 2-hydroxyethyltrimethylammonium hydroxide (Example XVIII) results in an increase in melting point, a significant reduction (74 percent) of diethylene glycol content in the high polymerizer, and a significant decrease (76 percent) in major defects during spinning. Such significant improvements are not obtained if quaternary ammonium bases, such as taught by U.S. Pat. No. 3,325,454, are added directly to the esterifier. In addition to the above improvements, the salts of the present invention permit the use of higher temperatures in the esterifier Furthermore, the salts of the present invention provide two advantages, as illustrated by Examples IX, X, XI, XV, XVI, XVII and XVIII; (1) decreased diethylene glycol content of the polymer product and (2) increased productivity without sacrificing the quality of the polymer product, or alternatively, some combination of both advantages.

The determination of the diethylene glycol content of the polymers of the examples briefly is as follows: The sample is decomposed by alkaline methanolysis, neutralized with an excess of terephthalic acid, and filtered. The methanol solution which contains ethylene glycol and diethylene glycol is analyzed quantitatively by gas chromatography. The diethylene glycol content is reported as mole percent of total glycol content of the polymer. For a more detailed discussion, see R. Feinland, "Chromatography," page 857 in Volume 3 of the "Encyclopedia of Polymer Science and Technology," edited by H. F. Mark, N. G. Gaylord, and N. M. Bikales (Interscience Publishers, New York, 1965). The free carboxyl groups in the polymers of the examples are estimated by dissolving the polymer in a suitable solvent, neutralizing the free carboxyl groups with excess alcoholic sodium hydroxide solution and then back titrating potentiometrically with standard alcoholic hydrochloric acid solution. More detailed discussions may be found in "Chemical Analysis," by G. M. Braver and G. M. Kline, pages 653–659, in Volume 3 of the "Encyclopedia of Polymer Science and Technology," edited by H. F. Mark, N. G. Gaylord, and N. M. Bikales (Interscience Publishers, New York, 1965) and in "Techniques of End-Group Analysis," by O. F. Price, pages 218–220 in "Techniques of Polymer Characterization," edited by P. W. Allen [Butterworth and Co., (Publishers) Ltd., London, 1959]. The melting points of the polymers of the examples are determined by differential thermal analysis. For a detailed discussion see "Differential Thermal Analysis," by B. Ke, pages 37–65, in Volume 5 of the "Encyclopedia of Polymer Science and Technology," edited by H. F. Mark, N. G. Gaylord, and N. M. Bikales (Interscience Publishers, New York, 1966).

It is to be understood that the foregoing descriptions are merely illustrative of preferred embodiments of the invention of which many variations may be made by those skilled in the art within the scope of the following claims without departing from the spirit thereof.

What is claimed is:

1. In a continuous process for the production of polyethylene terephthalate by direct esterification of ethylene glycol and terephthalic acid, the improvement comprising the continuous addition to an esterification reactor, maintained at a temperature of from 200°0 C. to 300° C., of a carboxylic acid salt of a quaternary ammonium base, wherein the cation may be represented by the general formula:

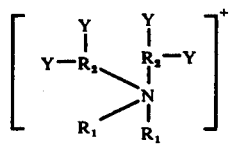

wherein $R_1$ is a monovalent group or radical independently selected from the group consisting of alkyl, cycloalkyl, aralkyl, alkaryl and aryl, $R_2$ is a trivalent group or radical independently selected from the group consisting of alkyl, cycloalkyl, aralkyl, alkaryl and aryl, and Y is a member selected from the group consisting of hydrogen and hydroxyl, at least one Y being hydroxyl.

2. The process of claim 1 wherein the salt of the quaternary base is a salt of choline base.

3. The process of claim 2 wherein the heated esterification reactor is maintained at a temperature of from about 200° C. to 260° C.

* * * * *